Figure 1:
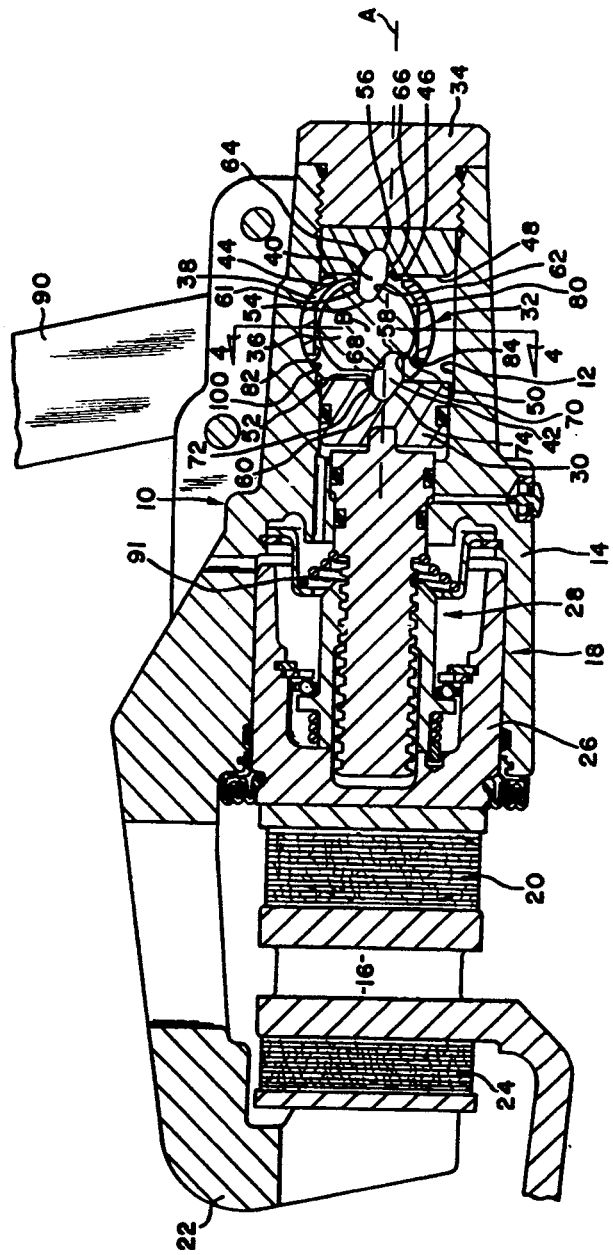

United States Patent [19]
Runkle

[11] Patent Number: 4,544,045
[45] Date of Patent: Oct. 1, 1985

[54] MECHANICAL ACTUATOR FOR A DISC BRAKE

[75] Inventor: Dean E. Runkle, LaPorte, Ind.

[73] Assignee: Allied Corporation, Morristown, N.J.

[21] Appl. No.: 704,139

[22] Filed: Feb. 21, 1985

Related U.S. Application Data

[63] Continuation of Ser. No. 481,515, Apr. 1, 1983, abandoned.

[51] Int. Cl.⁴ ............... F16D 55/224; F16D 65/16
[52] U.S. Cl. ............................. 188/72.6; 188/72.7; 188/72.9; 188/106 F
[58] Field of Search ............. 188/71.7, 71.8, 71.9, 188/72.1, 72.2, 72.6, 72.7, 72.8, 72.9, 106 F, 106 P, 196 D, 196 V, 217, 329, 330, 332, 333; 192/93 R, 93 B

[56] References Cited

U.S. PATENT DOCUMENTS

| 3,331,472 | 7/1967 | Swift | 188/72.6 |
| 3,511,346 | 5/1970 | Schlitz | 188/71.9 |
| 3,647,031 | 3/1972 | Burnett | 188/106 F |
| 4,109,765 | 8/1978 | Johannesen | 188/72.9 |
| 4,167,989 | 9/1979 | Meyer | 188/71.9 |

FOREIGN PATENT DOCUMENTS

| 2618966 | 11/1977 | Fed. Rep. of Germany | 188/72.6 |
| 1358453 | 3/1964 | France . | |
| 1172580 | 12/1969 | United Kingdom . | |
| 1244906 | 9/1971 | United Kingdom . | |
| 1407692 | 9/1975 | United Kingdom | 188/330 |
| 2074672 | 11/1981 | United Kingdom | 188/72.6 |

Primary Examiner—Bruce H. Stoner, Jr.
Assistant Examiner—Richard R. Diefendorf
Attorney, Agent, or Firm—Larry J. Palguta; Ken C. Decker

[57] ABSTRACT

A mechanical actuator for a disc brake assembly comprises a cam shaft and a pair of toggles. The cam shaft is designed with different interfaces for the pair of toggles to minimize travel for the cam shaft and maximize clamping forces during a parking brake application for the disc brake assembly.

10 Claims, 4 Drawing Figures

MECHANICAL ACTUATOR FOR A DISC BRAKE

This is a continuation of co-pending application Ser. No. 481,515, filed Apr. 1, 1983, now abandoned.

This invention relates to a mechanical actuator for a disc brake wherein a double toggle cooperates with a cam shaft during rotation of the latter to engage a pair of friction elements with a disc or rotor.

A disc brake assembly comprises a caliper assembly which includes a bore with a piston assembly therein so that when fluid pressure is communicated to the bore during a service brake application, the caliper assembly engages the pair of friction elements with the rotor. During a parking brake application, various devices such as ball ramps or screw threads are known to mechanically actuate or bias the pair of friction elements into engagement with the disc. These mechanical actuators are not widely accepted for heavy vehicles such as trucks. With heavy trucks a separate brake is provided for the drive shaft, or the truck is equipped with drum brakes to capitalize on the drum brake parking assembly which is believed to be more reliable than a disc brake parking assembly.

The present invention provides a mechanical actuator for a disc brake which can be fitted to a heavy truck for reliable braking when the parking brake is actuated. To this end the invention comprises a mechanical actuator for a disc brake wherein a caliper assembly cooperates with at least one friction pad to engage the latter with a rotor, the caliper assembly including a housing with a bore receiving a piston assembly which is movable in the bore to engage the friction pad with the rotor, and a mechanical actuator disposed in the bore for moving the piston assembly, the mechanical actuator comprising a cam shaft extending into the bore, a reaction toggle cooperating with the cam shaft and the housing and an output toggle disposed between the piston assembly and the cam shaft for imparting movement to the piston assembly in response to rotation of the cam shaft, characterized in that said reaction toggle and said output toggle cooperate with said cam shaft to define asymmetric interfaces therebetween whereby the angular travel for said toggles is different when said cam shaft is rotated and said cam shaft moves in the direction of said piston assembly.

It is an advantage of the present invention that a disc brake can be used for a heavy vehicle, such as a truck with a parking device incorporated therein, so that a separate parking device for a drive shaft is not required.

Figure 2:
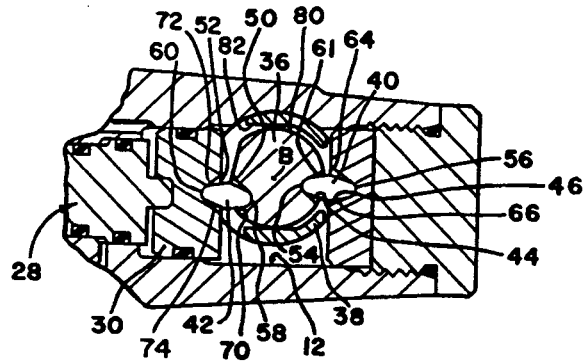
Figure 3:
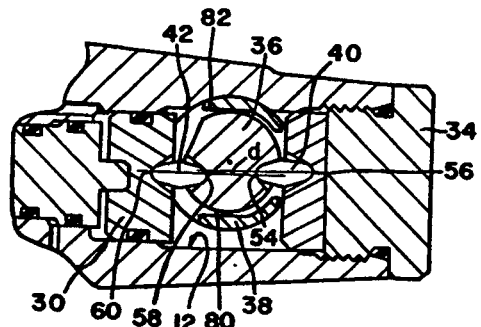
Figure 4:
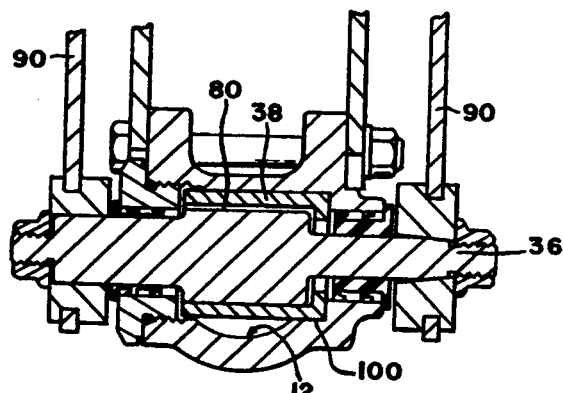

The invention will now be described with reference to the accompanying drawings, wherein, FIG. 1 is a side cross-sectional view of a disc brake assembly showing the mechanical actuator, FIG. 2 is a view similar to a portion of FIG. 1, but in a brake applied position, FIG. 3 is similar to FIG. 2 but in a fully applied position, and FIG. 4 is a cross section view along line 4—4 of FIG. 1.

The disc brake assembly includes a caliper assembly 10 with a bore 12 extending through an actuator leg 14 on one side of a rotor 16. The bore 12 receives a piston assembly 18 opposing a friction element 20 while a reaction leg 22 of the caliper assembly opposes a friction element 24. The piston assembly includes a first piston 26 directly engaging the friction element 20, an adjuster assembly 28 accomodating for lining wear to maintain a predetermined running clearance between the rotor and the friction elements, and a second piston 30 cooperating with a mechanical actuator 32, to be described hereinafter. A plug or cover 34 closes the end of the bore 12 remote from the rotor 16.

In accordance with the invention, the mechanical actuator 32 comprises a cam shaft 36 extending through the bore 12 near plug 34, a sleeve 38 supporting the cam shaft 36 within the bore 12, and a pair of toggles 40 and 42. Toggle 40 is a reaction toggle carried by a groove 44 in cam shaft 36 and a groove 46 formed by an end wall 48 adjacent or secured to plug 34. Toggle 42 is an output toggle carried by a groove 50 in cam shaft 36 and a groove 52 in piston 30.

In FIG. 1 the mechanical actuator is shown in a rest position. The bore 12 defines an axis A and cam shaft 36 defines a center B about which the cam shaft initially rotates. The center B is disposed above the axis A. The reaction toggle defines a moment at point 54 of groove 44 for cam shaft 36 and a reaction force is centered at point 56 of groove 46 for end wall 48. The output toggle defines a moment at point 58 of groove 50 for cam shaft 36 and an output force is centered at point 60 of groove 52 for piston 30. As shown at rest, the point 60 is aligned with the bore axis A, the point 58 is below the axis A, the point 54 is above the center B, and the point 56 is between the center B and the axis A. The groove 44 is U-shaped with a top side 61 and a bottom side 62. Similarly, the groove 46 is U-shaped with a top side 64 and a bottom side 66. At rest, the reaction toggle 40 is in full engagement with the cam shaft groove bottom side 62 and the end wall groove top side 64 so that a locking engagement or stop is formed between the cam shaft, reaction toggle and end wall. In the same manner, the cam shaft groove 50 is U-shaped with a top side 68 and a bottom side 70. The piston groove 52 is U-shaped with a top side 72 and a bottom side 74. At rest, the output toggle 42 is in full engagement with the cam shaft groove top side 68 and the piston groove bottom side 74 so that a locking engagement or stop is formed between the cam shaft 36, output toggle and piston.

The reaction toggle 40 and the output toggle 42 are identical so that switching of these parts is possible. The end wall groove 46 and the piston groove 52 are not identical as the sides 64 and 66 of groove 46 form an angle therebetween equal to 52 degrees while the sides 72 and 74 of groove 52 form an angle therebetween equal to 74 degrees. The cam shaft grooves 44 and 50 are not identical in shape or location. The sides 61 and 62 of groove 44 define an angle therebetween equal to about 54 degrees. As for location, the groove 44 at point 54 is disposed closer to center B so that a moment arm passing through point 54 will be closer to the center B than a moment arm passing through point 58 of groove 50. Conversely, the groove 50 disposes its point 58 closer to the outer edge or circumference 80 of cam shaft 36.

The sleeve 38 forms a vertical clearance via flat edges 82 and 84 with the circumference 80 of cam shaft 36 and is open in the direction of the rotor 16. The cam shaft is free to move axially and radially to a limited degree when rotated during operation in view of the flat edges 82 and 84.

The disc brake assembly operates in a conventional manner during a service brake application so that fluid pressure communicated to the bore 12 will urge the piston assembly to extend toward the rotor 16 to engage the friction element 20 with the rotor 16 and bias the caliper assembly to move the friction element 24 in engagement with the rotor 16.

During a parking brake application, a lever 90 coupled to the cam shaft 36 is rotated clockwise in FIG. 1. The cam shaft 36 rotates clockwise about its Center B. Initially, the cam shaft is engaging the bottom flat edge 84 of sleeve 38. As the cam shaft 36 rotates clockwise, the reaction toggle 40 will rotate about the inner end of groove 46 in a counter clockwise direction to impart a first increment of axial travel to the cam shaft 36. The output toggle is also rotated about the inner end of groove 52. With the cam shaft rotating in a clockwise direction, the output toggle is rotated to impart a second increment of axial travel to the piston 30. The piston 30 experiences axial travel corresponding to the first increment and the second increment. However, in view of the location for the grooves 44 and 50, the first increment of travel for the cam shaft, output toggle and piston 30 is less than the second increment of travel for the output toggle and piston 30. Consequently, the piston 30 will move through a greater axial distance than the cam shaft 36.

In the applied position of FIG. 2, the reaction toggle 40 is approaching full engagement with the bottom side 66 of groove 46 and the top side 61 of groove 44 to lock the reaction toggle at full engagement and prevent further rotation of the cam shaft about its center B. However, the output toggle remains spaced from the bottom side 70 of groove 50 and there remains a clearance between the flat edge 82 and the circumference 80 of cam shaft 36. In addition, the point 54 is now slightly below the point 56 and also below the center B. Further rotation of lever 90 causes the cam shaft 36 and the reaction toggle 40 to pivot as a unit about the bottom of groove 46 so that the cam shaft moves upwardly or radially in FIG. 2. This upward movement of the cam shaft further rotates output toggle 42 toward a horizontal setting for point 58 and 60 to further move piston 30 to a fully applied position as shown in FIG. 3.

It is understood that movement of the piston 30 causes the piston assembly to urge the friction element 20 into engagement with the rotor so that reaction forces will cause the caliper assembly to urge the friction element 24 into engagement with the rotor.

The caliper deflection, although slight, cooperates in combination with a return spring 91 and a suitable return spring coupled with lever 90 to return the parts of the mechanical actuator to their rest position upon termination of braking. As can be seen in FIG. 3, the center lines of toggles 40 and 42 are disposed so that a differential distance "d" exists between the center lines to prevent the output toggle from being locked in place, and permit reversible movement to their rest positions.

The caliper assembly includes a cross bore 100 which intersects bore 12 and the sleeve and cam shaft are disposed within the cross bore 100. Suitable seals or boots of flexible construction are disposed at the ends of the cross bore 100 to seal the sleeve and cam shaft to the caliper housing. With the piston 30 traveling a greater distance than the cam shaft 36 during operation of the mechanical actuator 32, the flexible seals or boots accommodate less movement of the cam shaft.

With the present invention, the cam shaft 36 is limited to 12-15 percent of the movement of the piston 30. Moreover, at the applied position of FIG. 2, the forces imparted to the piston 30 via toggle 42 are increased, when the cam shaft and reaction toggle rotate as a unit about the bottom of groove 46 near point 56, to fully engage the friction elements with the rotor and resist movement of the rotor relative to the caliper assembly.

I claim:

1. A dual toggle mechanical actuator for a disc brake within a caliper assembly cooperates with at least one friction pad to engage the latter with a rotor, the caliper assembly including a housing with a bore receiving a piston assembly which is movable in the bore to engage the friction pad with a rotor, and a mechanical actuator disposed in the bore for moving the piston assembly, characterized in that the mechanical actuator comprises an easily reversible, dual toggle mechanical actuator having a cam shaft extending into the bore, a reaction toggle cooperating with the cam shaft and the housing and an output toggle disposed between the piston assembly and the cam shaft for imparting movement to the piston assembly in response to rotation of the cam shaft, each of the toggles having a pair of pivot points about which the toggles move, the reaction toggle and output toggle cooperating with grooves of said cam shaft to define asymmetric interfaces therebetween so that angular travel of said toggles is different when said cam shaft is rotated and said cam shaft moves in the direction of said piston assembly, and an end wall enclosing said bore, the reaction toggle pivoting relative to said cam shaft and relative to said end wall during a first stage of braking when said cam shaft is rotated, and said reaction toggle moving with said cam shaft to pivot relative to said end wall during a second stage of braking, the output toggle approaching a lock position and the reaction toggle attaining a lock position relative to the respective grooves when said cam shaft has completed rotation wherein longitudinal center lines of the toggles remain a distance apart along a radius of said cam shaft so that the cam shaft may be counter-rotated easily to a rest position.

2. The mechanical actuator of claim 1 in which said cam shaft moves in the direction of said piston assembly in an amount equal to 12-15% of the movement for said piston assembly.

3. The mechanical actuator of claim 1 in which said reaction toggle is disposed at a 13 degrees angle relative to a horizontal axis in a rest position and said output toggle is disposed at a 16 degrees angle relative to the horizontal axis.

4. The mechanical actuator of claim 3 in which said output toggle is disposed at a 7 degrees angle relative to the horizontal axis in an applied position and said reaction toggle has moved past the horizontal axis in the applied position.

5. The mechanical actuator of claim 1 in which said housing bore defines a horizontally extending center line, said output toggle engaging said piston assembly in a rest position at said bore center line, said cam shaft defining a center disposed above said bore center line, said reaction toggle engaging the end wall closing said bore in the rest position at a horizontal position between said cam shaft center and said bore center line, and said reaction toggle engaging said cam shaft in the rest position at a horizontal position above the center of said cam shaft.

6. The mechanical actuator of claim 5 in which the engagement between said reaction toggle and said cam shaft moves horizontally below said cam shaft center when said cam shaft is rotated to a brake applied position.

7. The mechanical actuator of claim 1, further comprising a sleeve disposed in the bore and about said cam shaft, the movement of the cam shaft causing the cam shaft to disengage one side of the sleeve and engage an opposite side of said sleeve.

8. The mechanical actuator of claim 7, wherein the sleeve extends about less than the entire circumference of said cam shaft in order to permit said movement of the cam shaft.

9. An easily reversible, dual toggle mechanical actuator for a disc brake assembly wherein a caliper assembly cooperates with a pair of friction elements to engage the latter with a rotor, said mechanical actuator comprising a cam shaft and a pair of toggles with each toggle having a pair of pivot points about which the toggle moves, said cam shaft defining grooves having interfaces with said pair of toggles wherein one of said pair of toggles rotates more than the other of said pair of toggles during operation of said mechanical actuator to limit movement of said cam shaft, said cam shaft being rotatable relative to said pair of toggles during one stage of operation for said mechanical actuator and said cam shaft rotatable with said other toggle as a unit during a second stage of operation for said mechanical actuator, the one toggle approaching a lock position and the other toggle attaining a lock position relative to the respective grooves when said second stage of operation is completed wherein longitudinal center lines of the toggle do not cross over one another and remain a distance apart along a radius of said cam shaft so that the mechanical actuator is returned easily to a rest position.

10. The mechanical actuator of claim 9 in which said other toggle defines an angle relative to a horizontal axis and said other toggle angle approaches said horizontal axis and crosses the same as said mechanical actuator moves from said one stage to said second stage.

* * * * *